US009684755B2

United States Patent
Larzul (10) Patent No.: US 9,684,755 B2
(45) Date of Patent: Jun. 20, 2017

(54) ISOLATION OF IP UNITS DURING EMULATION OF A SYSTEM ON A CHIP

(71) Applicant: Synopsys, Inc., Mountain View, CA (US)

(72) Inventor: Ludovic Marc Larzul, Folsom, CA (US)

(73) Assignee: Synopsys, Inc., Mountain View, CA (US)

( * ) Notice: Subject to any disclaimer, the term of this patent is extended or adjusted under 35 U.S.C. 154(b) by 207 days.

(21) Appl. No.: 14/715,409

(22) Filed: May 18, 2015

(65) Prior Publication Data

US 2016/0342725 A1   Nov. 24, 2016

(51) Int. Cl.
*G06F 17/50* (2006.01)

(52) U.S. Cl.
CPC ...... *G06F 17/5077* (2013.01); *G06F 17/5054* (2013.01); *G06F 17/5068* (2013.01)

(58) Field of Classification Search
CPC .................................................. G06F 17/5077
USPC ......................................................... 716/126
See application file for complete search history.

(56) References Cited

U.S. PATENT DOCUMENTS

| 7,030,648 | B2 * | 4/2006 | Bal ................. | H03K 19/17736 326/38 |
| 7,188,063 | B1 * | 3/2007 | Snyder ............... | G06F 17/5027 703/26 |
| 2002/0091507 | A1 * | 7/2002 | Tseng ................ | G06F 17/5027 703/24 |
| 2015/0227662 | A1 * | 8/2015 | Lepercq ............. | G06F 17/5054 716/117 |
| 2016/0314232 | A1 * | 10/2016 | Larzul ............... | G06F 17/5054 |

\* cited by examiner

*Primary Examiner* — Suresh Memula
(74) *Attorney, Agent, or Firm* — Fenwick & West LLP (57) ABSTRACT

A host system receives a description of a design under test (DUT) that includes multiple IP units and is to be emulated by an emulator. The host system compiles the description of the DUT, which includes synthesizing the description, partitioning the DUT, and mapping the partitions to FPGAs included in the emulator that will emulate the DUT. Each IP unit is part of a single partition or partitioned into multiple partitions and mapped to a different set of FPGAs. The host system identifies connections in the DUT between IP units. The host system designates one or more FPGAs of the emulator that have not been allocated to emulate IP units as interface FPGAs. The host system determines a route for each of the identified connections through one of the interface FPGAs. The connections are routed so that there are no direct connections between the sets of FPGAs of two IP units.

15 Claims, 5 Drawing Sheets

ISOLATION OF IP UNITS DURING EMULATION OF A SYSTEM ON A CHIP

BACKGROUND

1. Field of Art

The disclosure generally relates to the emulation of designs, and more specifically to routing connections between units of a design through one or more interface field programmable gate arrays (FPGAs) of an emulator.

2. Description of the Related Art

Emulators have been developed to assist circuit designers in designing and debugging highly complex integrated circuit designs, such as a system on a chip (SOC). An emulator includes multiple field programmable gate arrays (FPGAs) that together can imitate the operations of a design under test (DUT). By using an emulator to imitate the operations of a DUT, designers can verify whether a DUT complies with various design requirements prior to fabrication.

A DUT typically includes multiple intellectual property (IP) units, such as a central processing unit (CPU), graphics processing unit (GPU), and peripheral component interface (PCI). In an emulator one or more FPGAs are configured emulate each of the units. For example, a first group of FPGAs may emulate the CPU and another group of FPGAs may emulate the GPU. During emulation, signals exchanged between the FPGAs of two IP units may be routed through the FPGAs of another IP unit, for example, if there are no direct connections between the FPGAs of the two IP units. As a result, if a change is made to either of the two IP units (e.g., during debugging), the FPGAs of all three IP units may have to be reconfigured. In an emulation environment that includes many IP units, this may mean hundreds of FPGAs being reconfigured which is very time consuming and inefficient.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. The figures depict embodiments of the disclosed system (or method) for purposes of illustration only. It should be recognized from the following description that alternative embodiments of the structures and methods illustrated herein may be employed without departing from the principles described herein.

Configuration Overview

A disclosed system (and method and computer program product) includes configuring an emulator to route connections between intellectual property (IP) units through one or more interface field programmable gate arrays (FPGAs) that do not emulate any of the IP units. As part of configuring the emulator, a host system receives a description of a design under test (DUT). The DUT includes multiple IP units. The host system compiles the description of the DUT, which includes synthesizing the description of the DUT, partitioning the DUT, and mapping the partitions to FPGAs included in the emulator that will emulate the DUT.

The partitioning and mapping includes the host system mapping each IP unit to a different set of FPGAs that will emulate the IP unit. Further, the host system identifies the connections in the DUT between IP units. The host system designates FPGAs of the emulator that have not been allocated to emulate IP units as interface FPGAs and routes the connections through the interface FPGAs. Hence, in the emulator, each connection between the sets of FPGAs of two IP units is routed through an interface FPGA. As a result, if an IP unit is modified (e.g., as part of debugging), the FPGAs of that IP unit and its respective one or more interface FPGAs are the only FPGAs that have to be reconfigured. The FPGAs of the other IP units do not have to be reconfigured.

Example Emulation Environment

Figure 1:
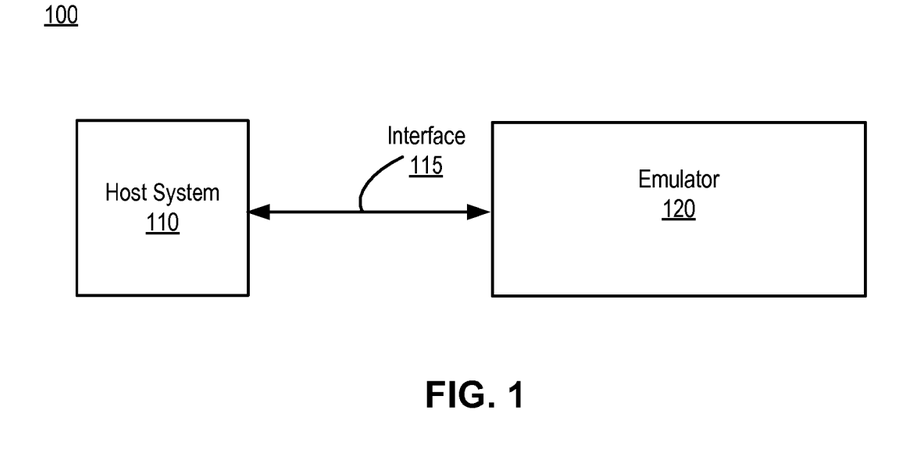
FIG. 1 is a block diagram of an emulation environment, according to one embodiment.

FIG. 1 is a block diagram illustrating an emulation environment 100, according to one embodiment. The emulation environment 100 includes a host system 110 and an emulator 120. The host system 110 communicates with the emulator 120 through an interface 115.

The interface 115 is a communication medium that allows communication between the host system 110 and the emulator 120. In one embodiment, the interface 115 is one or more cables with electrical connections. For example, the interface 115 may be one or more RS232, USB, LAN, optical, or custom built cables. In other embodiment, the interface 115 is a wireless communication medium or a network with one or more points of access. For another example, the interface 115 may be a wireless communication medium employing a Bluetooth® or IEEE 802.11 protocol.

The emulator 120 is a hardware system that emulates DUTs. A DUT comprises one or more circuit designs that are to be emulated by the emulator 120. In one embodiment, a DUT is a system on a chip (SOC). As described herein, the circuit designs, comprising a DUT, may include multiple IP units. An IP unit is a specialized block of logic designed to perform certain functions. An IP unit may be, for example, a central processing unit (CPU), graphics processing unit (GPU), peripheral component interface (PCI), USB interface, etc.

The emulator 120 includes multiple FPGA boards. Each FPGA board includes multiple FPGAs and one or more connectors that connect the FPGA board to one or more of the other FPGA boards. Although, the emulator 120 is described here as including FPGAs, it should be understood that in other embodiments the emulator 120 may include other types of reconfigurable logic blocks instead of the FPGAs.

For a DUT that is to be emulated, the emulator 120 receives from the host system 110 one or more bit files including a description of the DUT. The bit files further describe partitions of the DUT created by the host system 110, mappings of the partitions to the FPGAs of the emulator 120, and routing of connections between the emulator FPGAs. Based on the bit files, the emulator 120 configures the FPGAs to perform specific designated functions. The emulator 120 emulates the DUT. Based on the emulation, the emulator 120 generates emulation results that are transmitted to the host system 110 for analysis.

The host system 110 generates information to configure the emulator 120 to emulate a DUT. The host system 110 may be a single computer or a collection of multiple computers. In the embodiment where the host system 110 is comprised of multiple computers, the functions described herein as being performed by the host system 110 may be distributed among the multiple computers. Further, the host system 110 may be indirectly connected to the emulator 120 through another device, computer or network.

The host system 110 receives (e.g., from a user) a description of a DUT to be emulated. The DUT includes multiple IP units. In one embodiment, the DUT description is done by using hardware description language (HDL), such as register transfer language (RTL). In another embodiment, the DUT description is done by using netlist level files, or a mix of netlist level files and HDL files. The host system 110 compiles the description of the DUT. Compiling the description of the DUT includes the host system 110 creating a gate level netlist based on the description of the DUT. The host system 110 further uses the netlist to partition the DUT and maps each partition to one or FPGAs included in the emulator 120.

As part of the partitioning and mapping, the host system 110 maps each IP unit to a different set of FPGAs included in the emulator 120 that will emulate the IP unit. An IP unit may be made up of one or more partitions. In one embodiment, each partition of an IP unit is mapped to a different FPGA in its set of FPGAs.

In one embodiment, the host system 110 designates certain FPGAs included in the emulator 120 as FPGAs to which IP units will be mapped (also referred to as unit FPGAs) and other emulator FPGAs as FPGAs through which signals between IP units will be routed (also referred to as interface FPGAs). In one embodiment, no portion of an IP unit can be mapped to an FPGA designated as an interface FPGA. In another embodiment, if a signal between two IP units is routed through an interface FPGA, no portion of the two IP units can be mapped to the interface FPGA. However, logic of another IP unit (different from the two IP units) can be mapped to the interface FPGA. In another embodiment, the routing can be done through a routing component that is not an FPGA. In this embodiment the routing component specifically exists to route signals between IP units with the goal of isolating a set of FPGAs mapped to an IP unit from another set of FPGAs mapped to a different IP unit.

The host system 110 identifies the connections between IP units. The host system 110 determines a route for each identified connection through one or more emulator FPGAs that are designated as interface FPGA. By routing each identified connection through an interface FPGA, the host system 110 is isolating the set of FPGAs of each IP unit so that there are no direct connections between the FPGA sets of two IP units. In one embodiment, for each set of connections that an IP unit has with another IP unit, the host system 110 routes the set of connections through a different interface FPGA. For example, assume a first IP unit has connections with a second IP unit and a third IP unit. The host system 110 routes the connections between the first IP unit and the second IP unit through a first interface FPGA and connections between the first IP unit and the third IP unit through a second interface FPGA.

In one embodiment, for connections that have to go from one FPGA board to another FPGA board of the emulator 120, the host system 110 routes the connections through an interface FPGA on each board that is connected to connectors of the board. For example, assume a first IP unit is mapped to a first set of FPGAs on a first board and a second IP unit is mapped to a second set of FPGAs on a second board. Connections on the first board from the first set of FPGAs directed to the second board get routed through a first interface FPGA on the first board, where the first interface FPGA is connected to connectors of the first board. Connection on the second board from the second set of FPGAs directed to the first board get routed through a second interface FPGA on the second board, where the second interface FPGA is connected to connectors of the second board. This example is further described below with reference to FIG. 4B.

Based on compiling the description of the DUT, the host system 110 creates one or more bit files describing the partitioning of the DUT, the mapping of the partitions, and the routing of connections. The host system 110 transmits the bit files to the emulator 120 so that FPGAs of the emulator 120 can be properly configured for emulating the DUT.

Figure 4A:
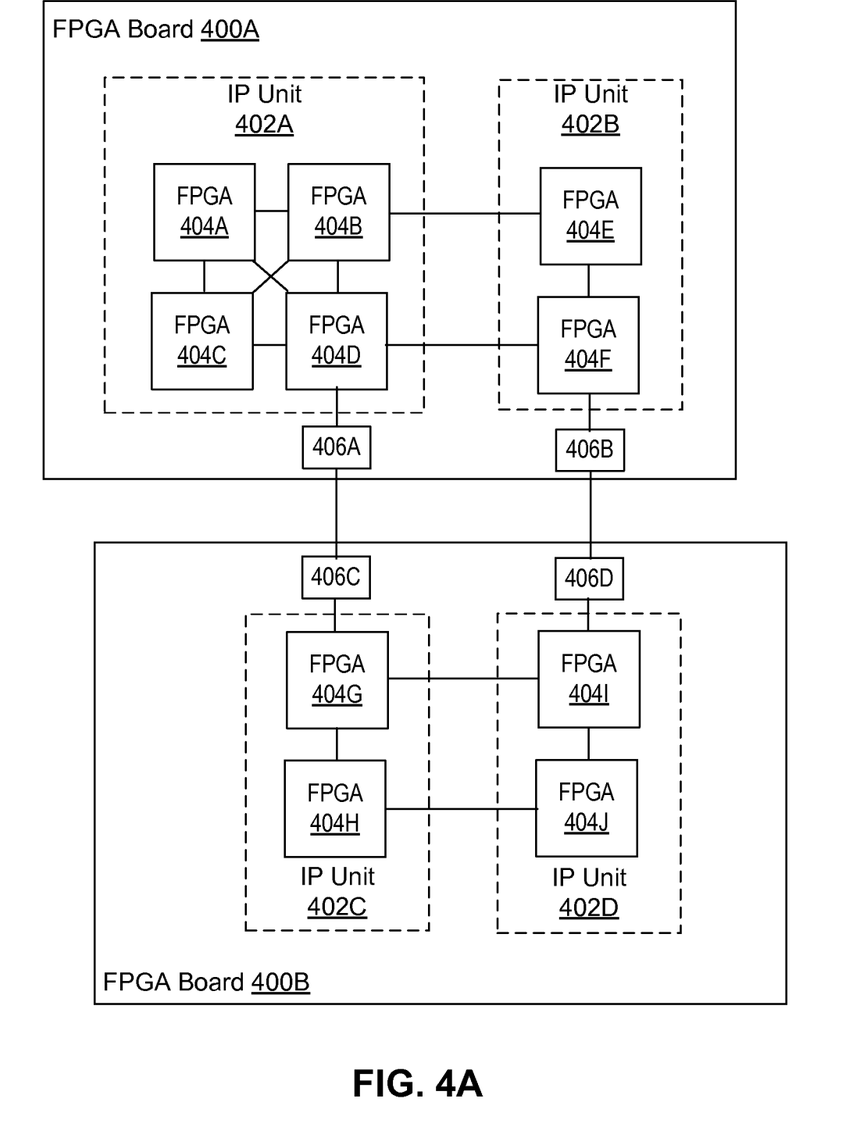
FIGS. 4A and 4B illustrate example configurations of connections in FPGA boards, according to one embodiment.

FIG. 4A illustrates an example where no interface FPGAs are used for routing connections. In this example, two FPGA boards 400A and 400B of the emulator 120 are illustrated. FPGA boards 400A and 400B are connected through connectors 406A-406D. FPGA board 400A includes FPGAs 404A-404D which are configured to emulate IP unit 402A and FPGAs 404E and 404F which are configured to emulate IP unit 402B. FPGA board 400B includes FPGAs 404G and 404H which are configured to emulate IP unit 402C and FPGAs 404I and 404J which are configured to emulate IP units 402D.

In this example, there are no direct connections between the FPGAs mapped to IP unit 402B and the FPGAs mapped to IP unit 402C (i.e., when mapped to FPGAs, there is no direct connection between IP units 402B and 402C). Hence, in this example signals exchanged between IP units 402B and 402C are routed through one or more FPGAs of IP unit 402A. After emulation of the IP units 402A-402D, if a user desires to make changes, for example, to IP units 402B and 402C, the host system 110 will have to recompile descriptions of IP units 402B and 402C and reconfigure FPGAs 404E-404H. Additionally, since signals between IP units 402B and 402C are routed through one or more FPGAs of IP unit 402A, IP unit 402A has to be recompiled and FPGAs 404A-404D have to be reconfigured. Hence, in this example, four extra FPGAs are being reconfigured.

Figure 4B:
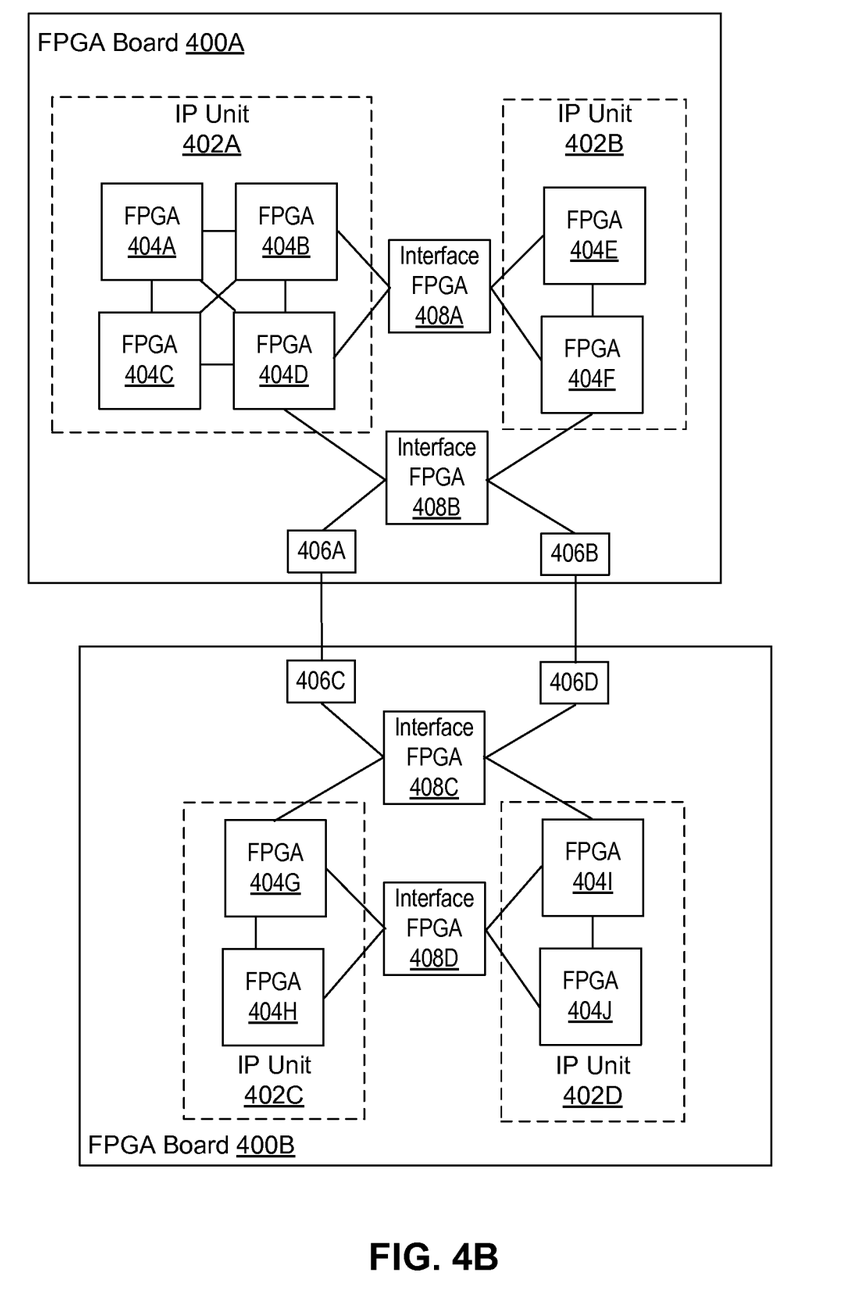

FIG. 4B illustrates an example where connections between IP units are routed through interface FPGAs. FIG. 4B illustrates the same FPGAs 404A-404J and mapping of the IP units 402A-404D. However, in this example, connections between IP units are routed through one or more of interface FPGAs 408A-408D. Connections between FPGAs of IP unit 402A and FPGAs of IP unit 402B are routed through interface FPGA 408A. Similarly, connections between FPGAs of IP unit 402C and FPGAs of IP unit 402D are routed through interface FPGA 408D. Further any connections going between FPGA boards 400A and 400B are routed through interface FPGA 408B on board 400A and interface FPGA 408C on board 400B. If changes are made to IP units 402B and 402C, in addition to FPGAs 404E-404H, the only other FPGAs that have to be reconfigured are interface FPGAs 408B and 408C. The FPGAs 404A-404D of IP unit 402A do not have to be reconfigured, thereby expediting the recompilation process.

Figure 2:
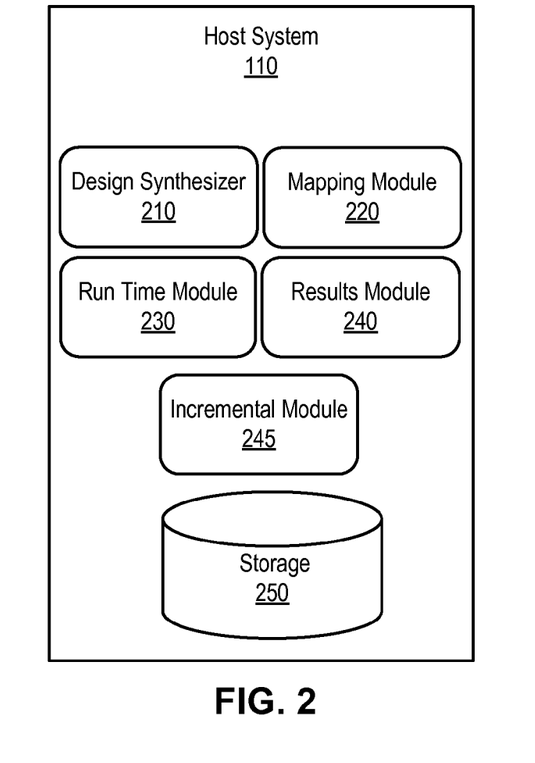
FIG. 2 is a block diagram illustrating a host system, according to one embodiment.

FIG. 2 is a block diagram illustrating the host system 110 in more detail, according to one embodiment. The host system 110 includes a design synthesizer 210, mapping module 220, run time module 230, results module 240, incremental module 245, and storage 250. Each of these components may be embodied as hardware, software, firmware, or a combination thereof. Together these components generate information to configure the emulator 120 and monitor the emulation results.

The design synthesizer 210 converts descriptions of DUTs into gate level logic. For a DUT that is to be emulated, the design synthesizer 210 receives a description of the DUT. The received description of the DUT includes multiple IP units. The description of the DUT is fully or partially in HDL (e.g., RTL or other level of abstraction). The design synthesizer 210 synthesizes the HDL of the DUT to create a gate level netlist with a description of the DUT in terms of gate level logic. The synthesis is performed in a way that the boundaries of the different IPs are kept as described in the HDL description.

The mapping module 220 partitions DUTs and maps partitions to emulator FPGAs. After the design synthesizer 210 creates a gate level netlist of the DUT, the mapping module 220 partitions the DUT at the gate level into a number of partitions using the netlist. The mapping module 220 maps each partition to one or more FPGAs of the emulator 120 designated as unit FPGAs. The mapping module 220 performs the partitioning and mapping using design rules, design constraints (e.g., timing or logic constraints), and information about the emulator 120.

Each IP unit included in the DUT is part of a single partition or is partitioned into multiple partitions. The mapping module 220 maps each partition of an IP unit to one or more unit FPGAs. Each IP unit is mapped to a different set of FPGAs, where the set may include one or more unit FPGAs. In another embodiment, the mapping is performed by IP unit prior to the synthesis and the synthesis is performed on each IP unit separately or together taking into account the mapping of each IP unit already done.

The mapping module 220 identifies connections between IP units from the description of the DUT (HDL or gate level netlist). The mapping module 220 designates one or more FPGAs of the emulator 120 that are free as interface FPGAs. In one embodiment, an FPGA is free if it has not been designated to emulate an IP unit or part of a unit (i.e., it has not been mapped to for emulating at least part of an IP unit). The mapping module 220 determines a route for each identified connection through one of the interface FPGAs. Hence, there are no direct connections between the FPGAs of one IP unit and the FPGAs of another IP unit. During emulation, an FPGA designated as an interface FPGA routes a signal received to an FPGA of an IP unit to which the signal is destined or to another interface FPGA connected to the FPGA of the IP unit.

In one embodiment, on each FPGA board of the emulator 120, the mapping module 220 designates at least one FPGA as an interface FPGA. In one embodiment, for each set of connections that an IP unit has with another IP unit, the mapping module 220 routes the connections through a different interface FPGA. For connections that have to go from one FPGA board to another FPGA board of the emulator 120 based on the mapping of the IP units, the mapping module 220 routes the connections through one or more interface FPGAs on each board that are connected to connectors of the board.

In one embodiment, on each FPGA board of the emulator 120, the mapping module 220 designates multiple FPGAs as interface FPGAs and the mapping module 220 determines to route a connection through the interface FPGA that results in having the shortest possible connection.

Based on the partitioning and the mapping, the mapping module 220 generates one or more bit files that describe the partitions, the mapping of logic to each FPGA of the emulator 120, and the connections between FPGAs. The bit files may include additional information, such as constraints of the DUT and any other information needed to emulate the DUT. In one embodiment, the mapping module 220 generates a bit file for each IP unit of the DUT. The mapping module 220 stores the generated bit files in the storage 250. Upon request from a user, the mapping module 220 transmits the bit files to the emulator 120 for the emulator 120 to emulate the DUT. The processes performed by the design synthesizer 210 and the mapping module 220 for a DUT (e.g., synthesizing the DUT description, partitioning and mapping) are collectively referred to herein as compilation of the DUT.

The run time module 230 controls emulations performed on the emulator 120. The run time module 230 may cause the emulator 120 to start or stop executing the emulation of a DUT. Additionally, the run time module 230 may provide input signals/data to the emulator 120 for the emulation of the DUT. The input signals may be provided directly to the emulator 120 through the interface 115 or indirectly through other input signal devices. For example, the host system 110 with the run time module 230 may control an input signal device such as a test board, signal generator, or a power supply, to provide the input signals to the emulator 120.

The results module 240 processes emulation results produced by the emulator 120. During the emulation of a DUT by the emulator 120 and/or after completing the emulation, the results module 240 receives emulation results from the emulator 120. The emulation results may include, for example, information on events detected during the emulation and the states of signals detected during the emulation. The results module 240 stores the emulations results in the storage 250. If a user requests emulation results, the results module 240 retrieves the requested results from the storage 250 and displays the emulation results to the user.

The incremental module 245 processes requests to make changes to IP units of a DUT. When a new description of an IP unit is received from a user for an emulated DUT or DUT being emulated (i.e., the user wishes to make changes to an IP unit included in the DUT), the incremental module 245 identifies the FPGAs included in the emulator 120 affected by the change to the IP unit. The FPGAs identified include the set of FPGAs configured to emulate the IP unit and the interface FPGAs through which connections of the IP unit are routed. The incremental module 245 instructs the design synthesizer 210 and the mapping module 220 to compile the new description of the IP unit and generate new bit files to reconfigure the identified FPGAs. Based on the instruction issued by the incremental module 245, the design synthesizer 210 synthesizes the new description of the IP unit. Further, the mapping module 220 partitions the IP unit to one or more partitions and maps the partitions to FPGAs of the emulator 120. The mapping module 220 also determines how to route the connections of the IP unit and generates new bit files for reconfiguring the affected FPGAs. The new bit files are transmitted to the emulator 120 for emulating the DUT according to the changes to the IP unit. In one embodiment, the mapping module 220 performs the functions of the incremental module 245.

Figure 3:
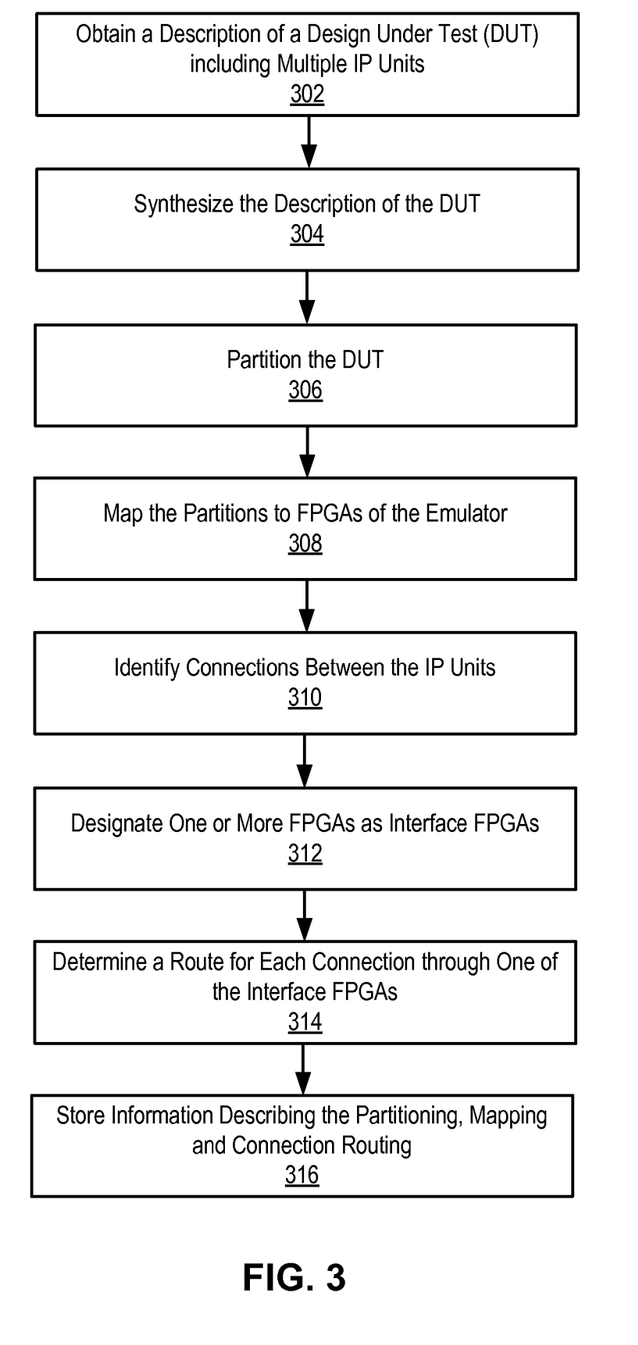
FIG. 3 is a flow chart illustrating the host system preparing a DUT for emulation, according to one embodiment.

FIG. 3 is a flow chart illustrating the host system 110 preparing a DUT for emulation, according to one example embodiment. Other embodiments can perform the steps of FIG. 3 in different orders. Moreover, other embodiments can include different and/or additional steps than the ones described here.

The host system 110 obtains 302 from a user a HDL description of a DUT that includes multiple IP units. The host system 110 synthesizes 304 the HDL description of the DUT to create a gate level netlist. The host system 110 partitions 306 the DUT at the gate level or HDL level into a number of partitions. The host system 110 maps 308 the partitions to FPGAs of the emulator 120. Each IP unit included in the DUT is part of a single partition or is partitioned into multiple partitions and mapped to a set of FPGAs of the emulator 120 that will emulate the DUT.

The host system 110 identifies 310 connections between the IP units. The host system 110 designates 312 one or more FPGAs of the emulator 120 as interface FPGAs. The FPGAs designated as interface FPGAs are FPGAs that have not been designated to emulate an IP unit. The host system 110 determines 314 a route for each of the identified connections through one of the interface FPGAs. The host system 110 stores 316 information describing for each IP unit the partitioning, mapping, and connection routing in files, as well as information describing the interconnections and routes between the IP units.

Computing Machine Architecture

Figure 5:
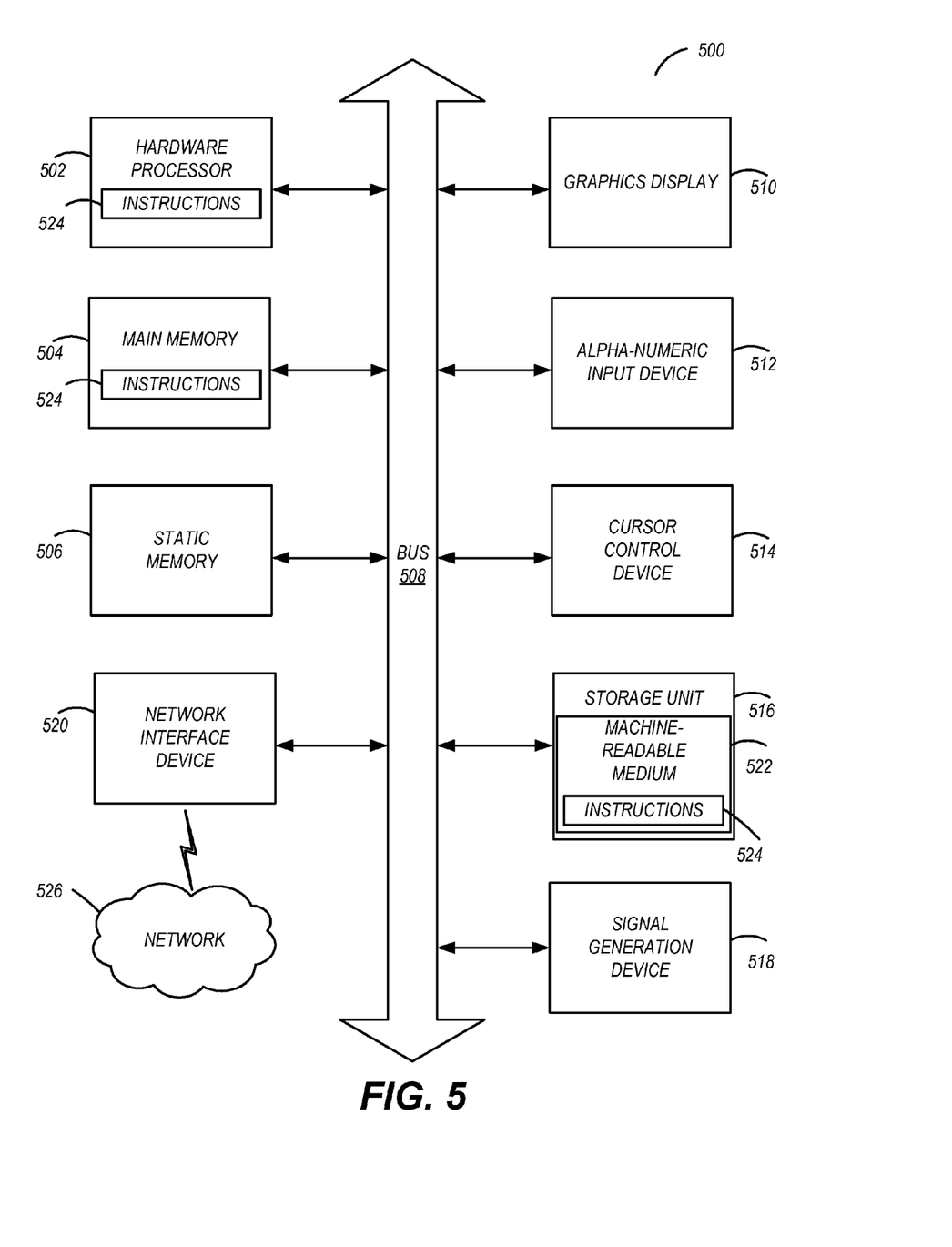
FIG. 5 illustrates one embodiment of components of an example machine able to read instructions from a machine-readable medium and execute them in a processor, according to one embodiment.

Turning now to FIG. 5, it is a block diagram illustrating components of an example machine able to read instructions from a machine-readable medium and execute them in a processor (or controller). Specifically, FIG. 5 shows a diagrammatic representation of a machine in the example form of a computer system 500 within which instructions 524 (e.g., software or program code) for causing the machine to perform (execute) any one or more of the methodologies described with FIGS. 1-4. The computer system 500 may be used for one or more of the entities (e.g., host system 110, emulator 120) illustrated in the emulation environment 100 of FIG. 1.

The example computer system 500 includes a hardware processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include graphics display unit 510 (e.g., a plasma display panel (PDP), a liquid crystal display (LCD), a projector, or a cathode ray tube (CRT)). The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 which stores instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

As is known in the art, a computer system 500 can have different and/or other components than those shown in FIG. 5. In addition, the computer system 500 can lack certain illustrated components. For example, a computer system 500 acting as the emulator 120 may include one or more hardware processors 502, multiple storage units 516, a network interface device 520, and multiple configurable logic circuits (as described above with reference to FIG. 1), among other components, but may lack an alphanumeric input device 512 and a cursor control device 514.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software (or computer program code)) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for efficient event detection of a digital circuit through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable medium storing instructions for isolating emulated units, the instructions to configure a host system to:
   identify a first set of field programmable gate arrays (FPGAs) included in an emulator and selected to emulate a first unit in a design under test (DUT);
   identify a second set of FPGAs included in the emulator and selected to emulate a second unit in the DUT, the second set of FPGAs different than the first set of FPGAs;
   designate an FPGA included in the emulator for routing connections between units of the DUT, the designated FPGA not part of the first and the second set of FPGAs; and determine a route for a connection between the first unit and the second unit through the designated FPGA.

2. The non-transitory computer readable medium of claim 1, wherein the designated FPGA is not configured to emulate a unit included in the DUT.

3. The non-transitory computer readable medium of claim 1, wherein the first unit has connections with a plurality of units included in the DUT and a third set of FPGAs included in the emulator are designated for routing connections between units of the DUT, and the instructions further configure the host system to:
  for each set of connections that the first unit has with a different unit from the plurality of units, determine to route each set of connections through a different FPGA from the third set of FPGAs.

4. The non-transitory computer readable medium of claim 1, wherein the designated FPGA is included in a first FPGA board of the emulator and determining the route for the connection further comprises:
  determine to route the connection through the designated FPGA included in the first FPGA board and through an additional FPGA designated for routing connections between units of the DUT and included in a second FPGA board of the emulator in response to the first set of FPGAs being included in the first FPGA board and the second set of FPGAs being included in the second FPGA board,
  wherein the designated FPGA is connected to a connector of the first FPGA board and the additional FPGA is connected to a connector of the second FPGA board.

5. The non-transitory computer readable medium of claim 1, wherein the DUT is a system on a chip.

6. The non-transitory computer readable medium of claim 1, wherein the first and second units are intellectual property units, each unit a specialized block of logic designed to perform specific functions.

7. The non-transitory computer readable medium of claim 1, the instructions to further configure the host system to:
  transmit to the emulator information describing the determined route for the connection for the emulator to emulate the DUT.

8. A computer system for isolating emulated units, the computer system comprising:
  one or more computer processors; and
  a non-transitory computer readable medium storing instructions when executed by the one or more processors cause the one or more processors to:
    identify a first set of field programmable gate arrays (FPGAs) included in an emulator and selected to emulate a first unit in a design under test (DUT);
    identify a second set of FPGAs included in the emulator and selected to emulate a second unit in the DUT, the second set of FPGAs different than the first set of FPGAs;
    designate an FPGA included in the emulator for routing connections between units of the DUT, the designated FPGA not part of the first and the second set of FPGAs; and
    determine a route for a connection between the first unit and the second unit through the designated FPGA.

9. The computer system of claim 8, wherein the designated FPGA is not configured to emulate a unit included in the DUT.

10. The computer system of claim 8, wherein the first unit has connections with a plurality of units included in the DUT and a third set of FPGAs included in the emulator are designated for routing connections between units of the DUT, and the instructions further cause the one or more processors to:
  for each set of connections that the first unit has with a different unit from the plurality of units, determine to route each set of connections through a different FPGA from the third set of FPGAs.

11. The computer system of claim 8, wherein the designated FPGA is included in a first FPGA board of the emulator and determining the route for the connection further comprises:
  determine to route the connection through the designated FPGA included in the first FPGA board and through an additional FPGA designated for routing connections between units of the DUT and included in a second FPGA board of the emulator in response to the first set of FPGAs being included in the first FPGA board and the second set of FPGAs being included in the second FPGA board,
  wherein the designated FPGA is connected to a connector of the first FPGA board and the additional FPGA is connected to a connector of the second FPGA board.

12. The computer system of claim 8, wherein the DUT is a system on a chip and the first and second units are intellectual property units, each unit a specialized block of logic designed to perform specific functions.

13. The computer system of claim 8, the instructions to further cause the one or more processors to:
  transmit to the emulator information describing the determined route for the connection for the emulator to emulate the DUT.

14. A method for isolating emulated units, the method comprising:
  identifying, by a host system, a first set of field programmable gate arrays (FPGAs) included in an emulator and selected to emulate a first unit in a design under test (DUT);
  identifying, by the host system, a second set of FPGAs included in the emulator and selected to emulate a second unit in the DUT, the second set of FPGAs different than the first set of FPGAs;
  designating, by the host system, an FPGA included in the emulator for routing connections between units of the DUT, the designated FPGA not part of the first and the second set of FPGAs; and
  determining, by the host system, a route for a connection between the first unit and the second unit through the designated FPGA.

15. A non-transitory computer readable medium storing instructions for isolating emulated units, the instructions to configure a host system to:
  identify a first set of reconfigurable logic blocks included in an emulator and selected to emulate a first unit in a design under test (DUT);
  identify a second set of reconfigurable logic blocks included in the emulator and selected to emulate a second unit in the DUT, the second set of reconfigurable logic blocks different than the first set of reconfigurable logic blocks;
  designate a reconfigurable logic block included in the emulator for routing connections between units of the DUT; and
  determine a route for a connection between the first unit and the second unit through the designated reconfigurable logic block.

* * * * *